US009507778B2

(12) United States Patent
Jaffe et al.

(10) Patent No.: US 9,507,778 B2
(45) Date of Patent: Nov. 29, 2016

(54) SUMMARIZATION OF MEDIA OBJECT COLLECTIONS

(75) Inventors: Alexander B. Jaffe, Beverly Hills, CA (US); Mor Naaman, San Francisco, CA (US); Marc E. Davis, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1716 days.

(21) Appl. No.: 11/437,344

(22) Filed: May 19, 2006

(65) Prior Publication Data

US 2007/0271297 A1    Nov. 22, 2007

(51) Int. Cl.
| | | |
|---|---|---|
| *G06F 17/30* | (2006.01) | |
| *G06K 9/00* | (2006.01) | |
| *G06K 9/62* | (2006.01) | |
| *G11B 27/10* | (2006.01) | |

(52) U.S. Cl.
CPC ..... *G06F 17/30041* (2013.01); *G06F 17/3005* (2013.01); *G06F 17/30064* (2013.01); *G06F 17/30241* (2013.01); *G06K 9/00664* (2013.01); *G06K 9/6219* (2013.01); *G11B 27/105* (2013.01)

(58) Field of Classification Search
CPC .................. G06F 17/30719; G06F 17/30837; G06F 17/30864; G06F 17/301; G06F 17/30041; G06F 17/30064; G06F 17/3005; G06F 17/30241
USPC .................................................. 707/725, 736
See application file for complete search history.

(56) References Cited

U.S. PATENT DOCUMENTS

| | | |
|---|---|---|
| 5,446,891 A | 8/1995 | Kaplan et al. |
| 5,493,692 A | 2/1996 | Theimer et al. |

(Continued)

FOREIGN PATENT DOCUMENTS

| | | |
|---|---|---|
| EP | 1362302 | 11/2003 |
| JP | 2002312559 | 10/2002 |

(Continued)

OTHER PUBLICATIONS

Carbonell, J. et al. (Aug. 24-28, 1998). "The Use of MMR, Diversity-Based Reranking for Reordering Documents and Producing Summaries," *SIGIR '98: Proceedings of the 21st Annual International ACM SIGIR Conference on Research and Development in Information Retrieval*: Melbourne, Australia W.B. Croft et al. eds., pp. 335-336.

(Continued)

*Primary Examiner* — James Trujillo
*Assistant Examiner* — Fatima Mina
(74) *Attorney, Agent, or Firm* — James J. DeCarlo; Greenberg Traurig LLP

(57) ABSTRACT

In one example, an apparatus and method are provided for summarizing (or selecting a representative subset from) a collection of media objects. A method includes selecting a subset of media objects from a collection of geographically-referenced (e.g., via GPS coordinates) media objects based on a pattern of the media objects within a spatial region. The media objects may further be selected based on (or be biased by) various social aspects, temporal aspects, spatial aspects, or combinations thereof relating to the media objects and/or a user. Another method includes clustering a collection of media objects in a cluster structure having a plurality of subclusters, ranking the media objects of the plurality of subclusters, and selection logic for selecting a subset of the media objects based on the ranking of the media objects.

24 Claims, 4 Drawing Sheets

(56) References Cited

U.S. PATENT DOCUMENTS

| | | |
|---|---|---|
| 5,583,763 A | 12/1996 | Ateheson et al. |
| 5,651,068 A | 7/1997 | Klemba et al. |
| 5,761,662 A | 6/1998 | Dasan |
| 5,764,906 A | 6/1998 | Edelstein et al. |
| 5,781,879 A | 7/1998 | Arnold et al. |
| 5,784,365 A | 7/1998 | Ikeda |
| 5,794,210 A | 8/1998 | Goldhaber et al. |
| 5,802,510 A | 9/1998 | Jones |
| 5,835,087 A | 11/1998 | Herz |
| 5,903,848 A | 5/1999 | Takahashi |
| 5,920,854 A | 7/1999 | Kirsch et al. |
| 6,014,638 A | 1/2000 | Burge et al. |
| 6,021,403 A | 2/2000 | Horvitz et al. |
| 6,047,234 A | 4/2000 | Cherveny et al. |
| 6,098,065 A | 8/2000 | Skillen et al. |
| 6,112,181 A | 8/2000 | Shear et al. |
| 6,157,924 A | 12/2000 | Austin |
| 6,169,992 B1 | 1/2001 | Beall et al. |
| 6,212,552 B1 | 4/2001 | Biliris et al. |
| 6,266,667 B1 | 7/2001 | Olsson |
| 6,314,365 B1 | 11/2001 | Smith |
| 6,314,399 B1 | 11/2001 | Deligne et al. |
| 6,324,519 B1 | 11/2001 | Eldering |
| 6,327,590 B1 | 12/2001 | Chidlovskii et al. |
| 6,446,065 B1 | 9/2002 | Nishioka et al. |
| 6,490,698 B1 | 12/2002 | Horvitz et al. |
| 6,502,033 B1 | 12/2002 | Phuyal |
| 6,523,172 B1 | 2/2003 | Martinez-Guerra et al. |
| 6,571,279 B1 | 5/2003 | Herz et al. |
| 6,601,012 B1 | 7/2003 | Horvitz et al. |
| 6,662,195 B1 | 12/2003 | Langseth et al. |
| 6,665,640 B1 | 12/2003 | Bennett et al. |
| 6,694,316 B1 | 2/2004 | Langseth et al. |
| 6,701,311 B2 | 3/2004 | Biebesheimer et al. |
| 6,701,315 B1 | 3/2004 | Austin |
| 6,708,203 B1 | 3/2004 | Maker et al. |
| 6,731,940 B1 | 5/2004 | Nagendran |
| 6,741,980 B1 | 5/2004 | Langseth et al. |
| 6,757,661 B1 | 6/2004 | Blaser et al. |
| 6,773,344 B1 | 8/2004 | Gabai et al. |
| 6,781,920 B2 | 8/2004 | Bates et al. |
| 6,785,670 B1 | 8/2004 | Chiang et al. |
| 6,789,073 B1 | 9/2004 | Lunenfeld |
| 6,813,501 B2 | 11/2004 | Kinnunen et al. |
| 6,816,850 B2 | 11/2004 | Culliss |
| 6,829,333 B1 | 12/2004 | Frazier |
| 6,834,195 B2 | 12/2004 | Brandenberg et al. |
| 6,842,761 B2 | 1/2005 | Diamond et al. |
| 6,845,370 B2 | 1/2005 | Burkey et al. |
| 6,850,252 B1 | 2/2005 | Hoffberg |
| 6,853,913 B2 | 2/2005 | Cherveny et al. |
| 6,853,982 B2 | 2/2005 | Smith et al. |
| 6,882,977 B1 | 4/2005 | Miller |
| 6,904,160 B2 | 6/2005 | Burgess |
| 6,931,254 B1 | 8/2005 | Egner et al. |
| 6,961,660 B2 | 11/2005 | Underbrink et al. |
| 6,961,731 B2 | 11/2005 | Holbrook |
| 6,985,839 B1 | 1/2006 | Motamedi et al. |
| 7,010,492 B1 | 3/2006 | Bassett et al. |
| 7,027,801 B1 | 4/2006 | Hall et al. |
| 7,058,508 B2 | 6/2006 | Combs et al. |
| 7,058,626 B1 | 6/2006 | Pan et al. |
| 7,062,510 B1 | 6/2006 | Eldering |
| 7,065,345 B2 | 6/2006 | Carlton et al. |
| 7,065,483 B2 | 6/2006 | Decary et al. |
| 7,069,308 B2 | 6/2006 | Abrams |
| 7,073,129 B1 | 7/2006 | Robarts et al. |
| 7,110,776 B2 | 9/2006 | Sambin |
| 7,143,091 B2 | 11/2006 | Charnock et al. |
| 7,149,696 B2 | 12/2006 | Shimizu et al. |
| 7,181,438 B1 | 2/2007 | Szabo |
| 7,185,286 B2 | 2/2007 | Zondervan |
| 7,194,512 B1 | 3/2007 | Creemer et al. |
| 7,203,597 B2 | 4/2007 | Sato et al. |
| 7,209,915 B1 | 4/2007 | Taboada et al. |
| 7,219,013 B1 | 5/2007 | Young et al. |
| 7,236,969 B1 | 6/2007 | Skillen et al. |
| 7,254,581 B2 | 8/2007 | Johnson et al. |
| 7,257,570 B2 | 8/2007 | Riise et al. |
| 7,305,445 B2 | 12/2007 | Singh et al. |
| 7,320,025 B1 | 1/2008 | Steinberg et al. |
| 7,343,364 B2 | 3/2008 | Bram et al. |
| 7,395,507 B2 | 7/2008 | Robarts et al. |
| 7,404,084 B2 | 7/2008 | Fransdonk |
| 7,437,312 B2 | 10/2008 | Bhatia et al. |
| 7,451,102 B2 | 11/2008 | Nowak |
| 7,461,168 B1 | 12/2008 | Wan |
| 7,496,548 B1 | 2/2009 | Ershov |
| 7,522,995 B2 | 4/2009 | Nortrup |
| 7,529,811 B2 | 5/2009 | Thompson |
| 7,562,122 B2 | 7/2009 | Oliver et al. |
| 7,577,665 B2 | 8/2009 | Rameer et al. |
| 7,584,215 B2 | 9/2009 | Saari et al. |
| 7,624,104 B2 | 11/2009 | Berkhin et al. |
| 7,624,146 B1 | 11/2009 | Brogne et al. |
| 7,634,465 B2 | 12/2009 | Sareen et al. |
| 7,657,907 B2 | 2/2010 | Fennan et al. |
| 7,681,147 B2 | 3/2010 | Richardson-Bunbury et al. |
| 7,725,492 B2 | 5/2010 | Sittig et al. |
| 7,729,901 B2 | 6/2010 | Richardson-Bunbury et al. |
| 7,769,740 B2 | 8/2010 | Martinez |
| 7,769,745 B2 | 8/2010 | Naaman |
| 7,783,622 B1 | 8/2010 | Vandermolen et al. |
| 7,792,040 B2 | 9/2010 | Nair et al. |
| 7,802,724 B1 | 9/2010 | Nohr |
| 7,822,871 B2 | 10/2010 | Stolorz et al. |
| 7,831,586 B2 | 11/2010 | Reitter et al. |
| 7,865,308 B2 | 1/2011 | Athsani |
| 7,925,708 B2 | 4/2011 | Davis |
| 2001/0013009 A1 | 8/2001 | Greening et al. |
| 2001/0035880 A1 | 11/2001 | Musatov et al. |
| 2001/0047384 A1 | 11/2001 | Croy |
| 2001/0052058 A1 | 12/2001 | Ohran |
| 2002/0014742 A1 | 2/2002 | Conte et al. |
| 2002/0019849 A1 | 2/2002 | Tuvey et al. |
| 2002/0019857 A1 | 2/2002 | Harjanto |
| 2002/0023091 A1 | 2/2002 | Silberberg et al. |
| 2002/0023230 A1 | 2/2002 | Bolnick et al. |
| 2002/0035605 A1 | 3/2002 | McDowell et al. |
| 2002/0049968 A1 | 4/2002 | Wilson et al. |
| 2002/0052786 A1 | 5/2002 | Kim et al. |
| 2002/0052875 A1 | 5/2002 | Smith et al. |
| 2002/0054089 A1 | 5/2002 | Nicholas |
| 2002/0065844 A1 | 5/2002 | Robinson et al. |
| 2002/0069218 A1 | 6/2002 | Sull et al. |
| 2002/0099695 A1 | 7/2002 | Abajian et al. |
| 2002/0103870 A1 | 8/2002 | Shouji |
| 2002/0111956 A1 | 8/2002 | Yeo et al. |
| 2002/0112035 A1 | 8/2002 | Carey |
| 2002/0133400 A1 | 9/2002 | Terry et al. |
| 2002/0138331 A1 | 9/2002 | Hosea et al. |
| 2002/0152267 A1 | 10/2002 | Lennon |
| 2002/0169840 A1 | 11/2002 | Sheldon et al. |
| 2002/0173971 A1 | 11/2002 | Stirpe et al. |
| 2002/0178161 A1 | 11/2002 | Brezin et al. |
| 2002/0198786 A1* | 12/2002 | Tripp et al. ............. 705/26 |
| 2003/0008661 A1 | 1/2003 | Joyce et al. |
| 2003/0009367 A1 | 1/2003 | Morrison |
| 2003/0009495 A1 | 1/2003 | Adjaoute |
| 2003/0027558 A1 | 2/2003 | Eisinger |
| 2003/0032409 A1 | 2/2003 | Hutcheson et al. |
| 2003/0033331 A1 | 2/2003 | Sena et al. |
| 2003/0033394 A1 | 2/2003 | Stine et al. |
| 2003/0065762 A1 | 4/2003 | Stolorz et al. |
| 2003/0069877 A1 | 4/2003 | Grefenstette et al. |
| 2003/0069880 A1 | 4/2003 | Harrison et al. |
| 2003/0078978 A1 | 4/2003 | Lardin et al. |
| 2003/0080992 A1 | 5/2003 | Haines |
| 2003/0126250 A1 | 7/2003 | Jhanji |
| 2003/0149574 A1 | 8/2003 | Rudman |
| 2003/0154293 A1 | 8/2003 | Zmolek |
| 2003/0165241 A1 | 9/2003 | Fransdonk |
| 2003/0191816 A1 | 10/2003 | Landress et al. |
| 2004/0010492 A1 | 1/2004 | Zhao et al. |

(56) References Cited

U.S. PATENT DOCUMENTS

| | | |
|---|---|---|
| 2004/0015588 A1 | 1/2004 | Cotte |
| 2004/0030798 A1 | 2/2004 | Andersson et al. |
| 2004/0034752 A1 | 2/2004 | Ohran |
| 2004/0043758 A1 | 3/2004 | Sorvari et al. |
| 2004/0044736 A1 | 3/2004 | Austin-Lane et al. |
| 2004/0070602 A1 | 4/2004 | Kobuya et al. |
| 2004/0139025 A1 | 7/2004 | Coleman |
| 2004/0139047 A1 | 7/2004 | Rechsteiner |
| 2004/0148341 A1 | 7/2004 | Cotte |
| 2004/0152477 A1 | 8/2004 | Wu et al. |
| 2004/0183829 A1 | 9/2004 | Kontny et al. |
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0205629 A1* | 10/2004 | Rosenholtz ....... G06F 17/30861 715/207 |
| 2004/0209602 A1 | 10/2004 | Joyce et al. |
| 2004/0243623 A1 | 12/2004 | Ozer et al. |
| 2004/0260804 A1 | 12/2004 | Grabarnik et al. |
| 2004/0267880 A1 | 12/2004 | Patiejunas |
| 2005/0005242 A1 | 1/2005 | Hoyle |
| 2005/0015451 A1 | 1/2005 | Sheldon et al. |
| 2005/0015599 A1 | 1/2005 | Wang et al. |
| 2005/0050027 A1 | 3/2005 | Yeh |
| 2005/0050043 A1* | 3/2005 | Pyhalammi et al. ............. 707/6 |
| 2005/0055321 A1 | 3/2005 | Fratkina |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan |
| 2005/0149397 A1 | 7/2005 | Morgenstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1 | 8/2005 | Hull et al. |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2005/0234781 A1 | 10/2005 | Morgenstern |
| 2005/0273510 A1 | 12/2005 | Schuh |
| 2006/0020631 A1 | 1/2006 | Cheong Wan et al. |
| 2006/0026013 A1 | 2/2006 | Kraft |
| 2006/0026067 A1 | 2/2006 | Nicholas et al. |
| 2006/0026170 A1* | 2/2006 | Kreitler et al. ................ 707/10 |
| 2006/0031108 A1 | 2/2006 | Oran |
| 2006/0036588 A1* | 2/2006 | Frank et al. ....... 707/3 |
| 2006/0040719 A1 | 2/2006 | Plimi |
| 2006/0047563 A1 | 3/2006 | Wardell |
| 2006/0047615 A1 | 3/2006 | Ravin |
| 2006/0053058 A1 | 3/2006 | Hotchkiss et al. |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1 | 4/2006 | Boys |
| 2006/0106847 A1* | 5/2006 | Eckardt et al. ............... 707/101 |
| 2006/0116924 A1 | 6/2006 | Angeles et al. |
| 2006/0123053 A1 | 6/2006 | Scannell, Jr. |
| 2006/0129313 A1 | 6/2006 | Becker |
| 2006/0129605 A1 | 6/2006 | Doshi |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1 | 9/2006 | Savilampi |
| 2006/0212401 A1 | 9/2006 | Amerally et al. |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242126 A1* | 10/2006 | Fitzhugh ........................ 707/3 |
| 2006/0242139 A1 | 10/2006 | Butterfield et al. |
| 2006/0242178 A1 | 10/2006 | Butterfield et al. |
| 2006/0242259 A1 | 10/2006 | Vallath et al. |
| 2006/0258368 A1 | 11/2006 | Granito et al. |
| 2006/0282455 A1 | 12/2006 | Lee |
| 2007/0013560 A1 | 1/2007 | Casey |
| 2007/0015519 A1 | 1/2007 | Casey |
| 2007/0032244 A1* | 2/2007 | Counts et al. ............. 455/456.1 |
| 2007/0043766 A1 | 2/2007 | Nicholas et al. |
| 2007/0067104 A1 | 3/2007 | Mays |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0073641 A1 | 3/2007 | Perry et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1 | 5/2007 | Brubaker |
| 2007/0115373 A1* | 5/2007 | Gallagher et al. ......... 348/231.3 |
| 2007/0121843 A1 | 5/2007 | Atazky et al. |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0185599 A1 | 8/2007 | Robinson et al. |
| 2007/0185858 A1* | 8/2007 | Lu ..................... G06F 17/30864 |
| 2007/0192299 A1 | 8/2007 | Zuckerberg et al. |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0219708 A1 | 9/2007 | Brasche et al. |
| 2007/0233585 A1 | 10/2007 | Ben Simon et al. |
| 2007/0239348 A1 | 10/2007 | Cheung |
| 2007/0239517 A1 | 10/2007 | Chung et al. |
| 2007/0259653 A1 | 11/2007 | Tang et al. |
| 2007/0260508 A1 | 11/2007 | Barry et al. |
| 2007/0260604 A1 | 11/2007 | Haeuser et al. |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1 | 12/2007 | Altman et al. |
| 2007/0282675 A1 | 12/2007 | Varghese |
| 2007/0288278 A1 | 12/2007 | Alexander et al. |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 | 1/2008 | Medved et al. |
| 2008/0026804 A1 | 1/2008 | Baray et al. |
| 2008/0028031 A1 | 1/2008 | Bailey et al. |
| 2008/0040283 A1 | 2/2008 | Morris |
| 2008/0046298 A1 | 2/2008 | Ben-Yehuda et al. |
| 2008/0070588 A1 | 3/2008 | Morin |
| 2008/0086356 A1 | 4/2008 | Glassman et al. |

(56) References Cited

U.S. PATENT DOCUMENTS

| | | |
|---|---|---|
| 2008/0086431 A1 | 4/2008 | Robinson et al. |
| 2008/0091796 A1 | 4/2008 | Story et al. |
| 2008/0096664 A1 | 4/2008 | Baray et al. |
| 2008/0102911 A1 | 5/2008 | Campbell et al. |
| 2008/0104061 A1 | 5/2008 | Rezaei |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0114751 A1 | 5/2008 | Cramer et al. |
| 2008/0120183 A1 | 5/2008 | Park |
| 2008/0120308 A1 | 5/2008 | Martinez et al. |
| 2008/0120690 A1 | 5/2008 | Norlander et al. |
| 2008/0133750 A1 | 6/2008 | Grabarnik et al. |
| 2008/0147655 A1 | 6/2008 | Sinha et al. |
| 2008/0147743 A1 | 6/2008 | Taylor et al. |
| 2008/0148175 A1 | 6/2008 | Naaman et al. |
| 2008/0154720 A1 | 6/2008 | Gounares |
| 2008/0163284 A1 | 7/2008 | Martinez et al. |
| 2008/0172632 A1 | 7/2008 | Stambaugh |
| 2008/0177706 A1 | 7/2008 | Yuen |
| 2008/0270579 A1 | 10/2008 | Herz et al. |
| 2008/0285886 A1 | 11/2008 | Allen |
| 2008/0301250 A1 | 12/2008 | Hardy et al. |
| 2008/0320001 A1 | 12/2008 | Gaddam |
| 2009/0005987 A1 | 1/2009 | Vengroff et al. |
| 2009/0006336 A1 | 1/2009 | Forstall et al. |
| 2009/0012934 A1 | 1/2009 | Yerigan |
| 2009/0012965 A1 | 1/2009 | Franken |
| 2009/0043844 A1 | 2/2009 | Zimmet et al. |
| 2009/0044132 A1 | 2/2009 | Combel et al. |
| 2009/0063254 A1 | 3/2009 | Paul et al. |
| 2009/0070186 A1 | 3/2009 | Buiten et al. |
| 2009/0073191 A1 | 3/2009 | Smith et al. |
| 2009/0076889 A1 | 3/2009 | Jhanji |
| 2009/0100052 A1 | 4/2009 | Stern et al. |
| 2009/0106356 A1 | 4/2009 | Brase et al. |
| 2009/0125517 A1 | 5/2009 | Krishnaswamy et al. |
| 2009/0132941 A1 | 5/2009 | Pilskalns et al. |
| 2009/0144141 A1 | 6/2009 | Dominowska et al. |
| 2009/0150501 A1 | 6/2009 | Davis et al. |
| 2009/0150507 A1 | 6/2009 | Davis et al. |
| 2009/0165051 A1 | 6/2009 | Armaly |
| 2009/0171939 A1 | 7/2009 | Athsani et al. |
| 2009/0177603 A1 | 7/2009 | Honisch |
| 2009/0187637 A1 | 7/2009 | Wu et al. |
| 2009/0204484 A1 | 8/2009 | Johnson |
| 2009/0204672 A1 | 8/2009 | Jetha et al. |
| 2009/0204676 A1 | 8/2009 | Parkinson et al. |
| 2009/0216606 A1 | 8/2009 | Coffman et al. |
| 2009/0222302 A1 | 9/2009 | Higgins |
| 2009/0222303 A1 | 9/2009 | Higgins |
| 2009/0234814 A1 | 9/2009 | Boerries et al. |
| 2009/0234909 A1 | 9/2009 | Strandeil et al. |
| 2009/0249482 A1 | 10/2009 | Sarathy |
| 2009/0265431 A1 | 10/2009 | Janie et al. |
| 2009/0281997 A1 | 11/2009 | Jain |
| 2009/0299837 A1 | 12/2009 | Steelberg et al. |
| 2009/0313546 A1 | 12/2009 | Katpelly et al. |
| 2009/0320047 A1 | 12/2009 | Khan et al. |
| 2009/0323519 A1 | 12/2009 | Pun |
| 2009/0328087 A1 | 12/2009 | Higgins et al. |
| 2010/0002635 A1 | 1/2010 | Eklund |
| 2010/0014444 A1 | 1/2010 | Ghanadan et al. |
| 2010/0063993 A1 | 3/2010 | Higgins et al. |
| 2010/0070368 A1 | 3/2010 | Choi et al. |
| 2010/0118025 A1 | 5/2010 | Smith et al. |
| 2010/0125563 A1 | 5/2010 | Nair et al. |
| 2010/0125569 A1 | 5/2010 | Nair et al. |
| 2010/0125604 A1 | 5/2010 | Martinez et al. |
| 2010/0125605 A1 | 5/2010 | Nair et al. |
| 2010/0185642 A1 | 7/2010 | Higgins et al. |

FOREIGN PATENT DOCUMENTS

| | | |
|---|---|---|
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | WO2006/116196 | 11/2006 |
| WO | WO-2006/116196 A2 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

Davis, M. et al. (Oct. 10-16, 2004). "From Context to Content: Leveraging Context to Infer Media Metadata," *MM'04* New York, New York.

Davis, M. et al. "From Context to Content: Leveraging Context for Mobile Media Metadata."

Davis. M. et al. (Apr. 2-7, 2005). "MMM2: Mobile Media Metadata for Media Sharing," *CHI 2005* Portland, Oregon.

Davis, M. et al. "Mobile Media Metadata for Mobile Imaging."

Davis, M. et al. "Using Context and Similarity for Face and Location Identification."

Flickr. "Welcome to Flickr—Photo Sharing," located at <http://www.flickr.com> visited on Feb. 26, 2007, one page.

Goldberger, J. et al. "The Hungarian Clustering Method," located at <http://scholar.googles.com/scholar?num=20&hl=en&lr=&9=cache:vbwslsm1CisJ:www.openu.ac.il/Personal_sites/tamirtassa/Publications/hcm.pdf+goldberger+clustering+method+hungarian> visited on Mar. 1, 2007, twelve pages.

Graham, A. et al. (Jul. 13-17, 2002). "Time as Essence for Photo Browsing Through Personal Digital Libraries," *JCDL '02* Portland, Oregon.

Jaffe, A. et al. (May 23-26, 2006). "Generating Summaries for Large Collections of Geo-Referenced Photographs," *WWW 2006* Edinburgh, Scotland.

Jaffe, A. et al. (Oct. 26-27, 2006). "Generating Summaries and Visualization for Large Collections of Geo-Referenced Photographs," *MIR '06* Santa Barbara, California.

Joshi, D. et al. (Oct. 15-16, 2004). "The Story Picturing Engine: Finding Elite Images to Illustrate a Story Using Mtitual Reinforcement," *MIR '04* New York, New York.

Naaman, M. et al. (Nov. 2003). "From Where to What: Metadata Sharing for Digital Photographs with Geographic Coordinates," *In on the Move to Meaningful Internet Systems 2003: CoopIS, DOA, and ODBASE* R. Meersman et al. eds., pp. 196-217.

Nair, R. et al. (Nov. 6-11, 2005). "Photo LOI: Browsing Multi-User Photo Collections," *MM'05* Singapore, pp. 223-224.

O'Hare, N. et al. "Combination of Content Analysis and Context Features for Digital Photograph Retrieval."

Pigeau, A. et al. (Jun. 17, 2005). "Organizing a Personal Image Collection with Statistical Model-Based ICL Clustering on Spatio-Temporal Camera Phone Meta-Data."

Sarvas, R. et al. (Jun. 6-9, 2004). "Metadata Creation System for Mobile Images," *MobiSys'04* Boston, Massachusetts, pp. 36-48.

Toyama, K. et al. (Nov. 2-8, 2003). "Geographic Location Tags on Digital Images," *MM '03*: Berkeley: California.

U.S. Appl. No. 11/593,668, filed Nov. 6, 2006, for Naaman et al.
U.S. Appl. No. 11/593,869, filed Nov. 6, 2006, for Naaman et al.
U.S. Appl. No. 12/409,867, filed Mar. 24, 2009, King.
U.S. Appl. No. 12/540,098, filed Aug. 12, 2009, Martinez.
U.S. Appl. No. 12/536,892, filed Aug. 6, 2009, King.
U.S. Appl. No. 12/540,588, filed Aug. 13, 2009, Tendjoukian.
U.S. Appl. No. 12/015,115, filed Jan. 16, 2006, Higgins.
U.S. Appl. No. 12/180,486, filed Jul. 25, 2008, Higgins.

(56) References Cited

OTHER PUBLICATIONS

U.S. Appl. No. 12/180,499, filed Jul. 25, 2008, Higgins.
U.S. Appl. No. 12/015,146, filed Jan. 16, 2008, Higgins.
U.S. Appl. No. 12/041,088, filed Mar. 3, 2008, Higgins.
U.S. Appl. No. 12/041,062, filed Mar. 3, 2008, Higgins.
U.S. Appl. No. 12/041,054, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/407,690, filed Mar. 19, 2009, Davis.
U.S. Appl. No. 12/407,681, filed Mar. 19, 2009, Athsani.
International Search Report (PCT/US2009/030405) dated Sep. 23, 2009; 2 pages.
U.S. Appl. No. 12/041,054, filed Mar. 3, 2008; 64 pgs.
U.S. Appl. No. 12/041,062, filed Mar. 3, 2008; 66 pgs.
U.S. Appl. No. 12/041,088, filed Mar. 3, 2008; 66 pgs.
U.S. Appl. No. 12/169,931, filed Jul. 9, 2008; 66 pgs.
U.S. Appl. No. 12/170,025, filed Jul. 9, 2008; 67 pgs.
U.S. Appl. No. 12/180,499, filed Jul. 25, 2008; 67 pgs.
U.S. Appl. No. 12/180,486, filed Jul. 25, 2008; 65 pgs.
International Search Report PCT/US2009/030406 dated Sep. 29, 2009; 5 pages.
International Search Report and Written Opinion PCT/US2009/034445 dated Oct. 12, 2009; 7 pages.
Office Action U.S. Appl. No. 12/041,054 dated Oct. 27, 2010; 15 pages.
Office Action U.S. Appl. No. 12/041,062 dated Oct. 28, 2010; 12 pages.
International Search Report PCT/US2009/034444 dated Sep. 18, 2009; 2 pages.
Office Action U.S. Appl. No. 12/041,088 dated Oct. 4, 2010; 18 pages.
U.S. Appl. No. 11/952,007, filed Dec. 6, 2007, Davis.
U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/953,454, filed Dec. 10, 2007, Davis.
U.S. Appl. No. 11/953,494, filed Dec. 10, 2007, Davis.
U.S. Appl. No. 12/236,668, filed Sep. 24, 2008, Davis.
U.S. Appl. No. 12/595,594, filed Mar. 31, 2008, Martinez.
U.S. Appl. No. 12/057,878, filed Mar. 28, 2008, Martinez.
U.S. Appl. No. 12/057,943, filed Mar. 28, 2008, Martinez.
U.S. Appl. No. 11/969,751, filed Jan. 4, 2008, Martinez.
U.S. Appl. No. 12/145,145, filed Jun. 24, 2008, Davis.
U.S. Appl. No. 12/163,249, filed Jun. 27, 2008, Kalaboukis.
U.S. Appl. No. 12/182,969, filed Jul. 30, 2008, Higgins.
U.S. Appl. No. 12/182,813, filed Jul. 30, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2008, Martinez.
U.S. Appl. No. 12/241,590, filed Sep. 30, 2008, Athsani.
U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.
U.S. Appl. No. 12/273,345, filed Nov. 18, 2008, Nair.
U.S. Appl. No. 12/241,198, filed Sep. 30, 2008, Higgins.
U.S. Appl. No. 12/273,259, filed Nov. 11, 2008, Martinez.
U.S. Appl. No. 12/339,355, filed Dec. 19, 2008, Higgins.
U.S. Appl. No. 12/329,038, filed Dec. 5, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12/273,371, filed Nov. 18, 2008, Nair.
U.S. Appl. No. 12/357,311, filed Jan. 21, 2009, Higgins.
U.S. Appl. No. 12/357,332, filed Jan. 1, 2009, Higgins.
U.S. Appl. No. 12/357,345, filed Jan. 1, 2009, Higgins.
U.S. Appl. No. 12/357,285, filed Jan. 21, 2009, Higgins.
Axup, Jeff et al., "Conceptualizing New Mobile Devices by Observing Gossip and Social Network Formation Amongst the Extremely Mobile", ITEE Technical Report #459, Dec. 19, 2005, pp. 1-71.
Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).
Davis, Marc et al., "From Context to Content: Leveraging Context to Infer Media Metadata", ACM Press, Oct. 10, 2004, pp. 1-8.
Kaasinen, E., "Behaviour & Information Technology", Taylor & Francis, vol. 24, No. 1, Jan./Feb. 2005, pp. 37-49, (Abstract only attached).
Konomi, Shin'ichi et al., "Supporting Colocated Interactions Using RFID and Social Network Displays", Pervasive Computing, Jul.-Sep. 2006, vol. 5, No. 3, pp. 48-56 (pp. 1-4 of attached).
Lin, F. et al., "A unified framework for managing Web-based services.", Information Systems and e-Business Management, vol. 3, Oct. 2005, p. 299, (pp. 1-15 of attached).
Metz, Cade, "MySpace Nation", PC Magazine, Jun. 21, 2006, pp. 1-10 attached.
Perkowitz, Mike et al., "Utilizing Online Communities to Facilitate Physical World Interactions", The International Conference on Communities and Technologies, Sep. 19, 2003, Amsterdam, pp. 1 6.
Roush, Wade, "Social Machines", Continuous Computing Blog, Jul. 5, 2005, pp. 1-21.
Roush, Wade, "Social Machines", Technology Review, Aug. 2005, pp. 45-51.
Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).
Voight, Joan et al., "Lessons for Today's Digital Market", ADWEEKCOM, Oct. 2, 2006, pp. 1-6.
"Companies add new communication features to photo sharing.", Digital Imaging Digest, Feb. 2006, pp. 1-2.
"Dave.TV and Eye Music Network Empower Users to Create Their Own Music TV Channel on Their Sites With New IPTV Channel", www.davenw.com/2006, Sep. 13, 2006, pp. 1-2.
"Digital rights management: a primer: developing a user-friendly means of protecting content.(Profile)", Screen Digest, No. 420, p. 305, Sep. 2006, (pp. 1-9 of attached).
"Emerging Markets: What media 2.0 can offer advertisers.", Campaign, Oct. 27, 2006, p. 26, (pp. 1-5 of attached).
"Reality Digital Debuts Opus", www.lightreading.com. Sep. 25, 2006, pp. 1.
"Reality Digital—Making Media Move", www.realitydigital.com, Nov. 28, 2006, pp. 1-2.
Nedos, A; Singh K., Clarke S, Proximity Based Group Communications for Mobile Ad Hoc Networks, Proximity-Based Group Communication; Global Smart Spaces; D.14; Oct. 3, 2003; 31 pages.
Brunato, M; Battiti R. "Pilgrim: A Location Broker and Mobility-Aware Recommendation System"; Technical report DIT-02-0092, Universita di Trento, Oct. 2002; 8 pages.
Backstrom et al., Spatial Variation in Search Engine Queries, WWW•2008, Beijing, China (Apr. 21-25, 2008).
Gan et al., Analysis of Geographic Queries in a Search Engine Log, LocWeb 2008, Beijing, China (Apr. 22, 2008).
Jones et al., Geographic Intention and Modification in Web Search, International Journal of Geographical Information Science, vol. 22, No. 3, pp. 1-20 (Jul. 2008).
Sanderson et al., Analyzing Geographic Queries; Department of Information Studies; University of Sheffield, UK; 2 pages.
Go With the Flow, The Economist Technology Quarterly, vol. 382, Issue 8519, 4 pages, (Mar. 10, 2007).
International Search Report and Written Opinion (PCT/US2009/060476) dated May 4, 2010; 12 pages.
International Search Report and Written Opinion (PCT/US2009/060374) dated Apr. 30, 2010; 12 pages.
International Search Report (PCT/US2009/060379) dated Apr. 30, 2010; 3 pages.
International Search Report and Written Opinion (PCT/US2008/085135) dated May 25, 2009; 7 pages.

(56) References Cited

OTHER PUBLICATIONS

International Search Report (PCT/US2009/055503) dated Apr. 8, 2010; 3 pages.
Written Opinion (PCT/US2008/085915) dated Jun. 29, 2009; 4 pages.
Written Opinion (PCT/US2008/086948) dated May 21, 2009; 5 pages.
International Search Report and Written Opinion (PCT/US2009/051247) dated Jan. 25, 2010; 9 pages.
International Search Report and Written Opinion (PCT/US2009/046258) dated Dec. 23, 2009; 7 pages.
Almieda, R.B. et al. "A Community-Aware Search Engine," WWW2004, New York., NY, May 17-22, 2004, pp. 413-421.
Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.
Anonymous. (Jul. 17, 2006). "Fantasy Football Lineup Analyzer—Tips for Who to Start & Who to Bench each Week," located at http://web.archive.org/web/200607171633529/www.
fantasyfootballstarters.com/lineupAnalyzer.jsp>, last visited on Feb. 10, 2009, one page.
Bharat, K. (Date Unknown). "SearchPad: Explicit Capture of Search Context to Support Web Search," located at <http://www9.org/w9cdrom/173/173.html >, last visited Aug. 1, 2007, 13 pages.
Budzik, J. et al. (2000). "User Interactions with Everyday Applications as Context for Just-in-Time Information Access," Proceedings of the 2000 Conference on Intelligent User Interfaces, eight pages.
Finkelstein, L. et al. (2001). "Placing Search in Context: The Concept Revisited," WWW/O, Hong Kong, May 2-5, 2001, pp. 406-414.
Freyne, J. et al. (2004). "Further Experiments on Collaborative Ranking in Community-Based Web Search," Artificial Intelligence Review, pp. 1-23.
Lieberman, H. (1995) "Letizia: An Agent that Assists Web Browsing," Proceedings of the Fourteenth International Joint Conference on Artificial Intelligence, Aug. 20-25, 1995, six pages.
Mitra, M. et al. (1998). "Improving Automatic Query Expansion," Proceedings of the AMC SIGIR, nine pages.
Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent . . .>, last visited Aug. 1, 2007, six pages.
Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.
Yahoo! Inc. (Dec. 7, 2005). "Yahoo! Widget Engine 3.0 Reference Manual Version 3.0," 300 pages.
U.S. Appl. No. 12/407,690, filed Mar. 19, 2009; 50 pages.
U.S. Appl. No. 12/407,681, filed Mar. 19, 2009; 56 pages.
International Search Report PCT/US2008/088228 dated Sep. 30, 2009—2 pages.
Written Opinion PCT/US2008/088228 dated Sep. 30, 2009—5 pages.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/593,869, filed Nov. 6, 2006, Naaman.
U.S. Appl. No. 12/237,709, filed Sep. 25, 2008, Martinez.
U.S. Appl. No. 11/353,657, filed Feb. 13, 2006, Naaman.
U.S. Appl. No. 11/562,979, filed Nov. 22, 2006, Martinez.
U.S. Appl. No. 12/273,317, filed Nov. 18, 2008, Rahul Nair.
U.S. Appl. No. 11/593,668, filed Nov. 6, 2006, Naaman.
Allen James F., "Maintaining Knowledge About Temporal Intervals", Communications of the ACM, Nov. 1983, vol. 26, No. 11 pp. 832-843; 12 pages.
Press Release, "QUALCOMM Conducts First Live Demonstration of FL Technology on a Wireless Handset", Qualcomm Inc., San Diego, Sep. 27, 2005; 3 pages.
MediaFlo, FLO Technology Overview, Qualcomm Inc. Copyright 2007; 24 pages.
Notification of Transmittal of the International Search Report and the Written Opinion of the International Search Authority, or Declaration (PCT/US2007/'084797) dated Mar. 21, 2008; 11 pages.
International Search Report (PCT/US2007/084807) dated May 27, 2008; 3 pages.
International Preliminary Report on Patentability (PCT/US2007/084807) dated May 26, 2009; 5 pages.
International Search Report (PCT/US2010/026063) dated May 27, 2008; 3 pages.
Rekimoto, et al., "CyberCode: designing augmented reality environments with visual tags." Proceedings of DARE 2000 on Designing augmented reality environments, Elsinore, Denmark, pp. 1-11 Apr. 12-14, 2000.
"Semacode-URL Barcodes-practical ubiquitous computing", located at http://semacode.org visited on Apr. 13, 2007; 3 pages.
"Technical White Paper: Choosing the best 2D barcode format for mobile apps," Semacode, Jul. 15, 2006; pp. 1-7 located at http://semacode.org/about/technical/whitepaper/best2_d_code.pdf.
Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.
Cooper, M. et al. (Nov. 2-8, 2003). "Temporal Event Clustering for Digital Photo Collections," MM'03 Berkeley, California, pp. 364-373.
Davis, M. et al. (Oct. 10-16, 2004). "From Context to Content: Leveraging Context to Infer Media Metadata," MM'04 New York, New York. 9 pages.
Davis, M. et al. "From Context to Content: Leveraging Context for Mobile Media Metadata." 9 pages.
Davis. M. et al. (Apr. 2-7, 2005). "MMM2: Mobile Media Metadata for Media Sharing," CHI 2005 Portland, Oregon. 4 pages.
Davis, M. et al. "Mobile Media Metadata for Mobile Imaging." Jun. 27-30, 2004; 4 pages.
Davis, M. et al. "Using Context and Similarity for Face and Location Identification." 10 pages.
Flickr. Welcome to Flickr—Photo Sharing, located at <http://www.flickr.com > visited on Feb. 26, 2007, one page.
Gargi, U. (Aug. 7, 2003). "Consumer Media Capture: Time-Based Analysis and Event Clustering," Technical Report HPL-2003-165 HP Laboratories Palo Alto, pp. 1-15.
Goldberger, J. et al. The Hungarian Clustering Method, located at <http://scholar.googles.com/scholar?num=20&h1=en&lr=
&9=cache:vbwslsm1CisJ:www.openu .acil/Personal_sites/tarnirtassa/Publications/hcm.
pdf+goldberger+clustering+method+hungarian> visited on Mar. 1, 2007, twelve pages.
Graham, A. et al. (Jul. 13-17, 2002). Time as Essence for Photo Browsing Through Personal Digital Libraries, JCDL '02 Portland, Oregon. 11 pages.
Jaffe, A. et al. (May 23-26, 2006). "Generating Summaries for Large Collections of Geo-Referenced Photographs," WWW 2006 Edinburgh, Scotland. 2 pages.
Jaffe, A. et al. (Oct. 26-27, 2006). "Generating Summaries and Visualization for Large Collections of Geo-Referenced Photographs," MIR '06 Santa Barbara, California. 11 pages.
Joshi, D. et al. (Oct. 15-16, 2004). "The Story Picturing Engine: Finding Elite Images to Illustrate a Story Using Miitual Reinforcement," MIR '04 New York, New York. 9 pages.
Naaman, M. et al. (Nov. 2003). "From Where to What: Metadata Sharing for Digital Photographs with Geographic Coordinates," In on the Move to Meaningful Internet Systems 2003: Coop/S, DOA, and ODBASE R. Meersman et al. eds., pp. 196-217.

(56) References Cited

OTHER PUBLICATIONS

Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.

Nair, R. et al. (Nov. 6-11, 2005). "Photo L01: Browsing Multi-User Photo Collections," MM'05 Singapore, pp. 223-224.

0' Hare, N. et al. "Combination of Content Analysis and Context Features for Digital Photograph Retrieval." 7 pages.

Pigeau, A. et al. (Jun. 17, 2005). "Organizing a Personal Image Collection with Statistical Model-Based ICL Clustering on Spatio-Temporal Camera Phone Meta-Data." 25 pages.

Sarvas, R. et al. (Jun. 6-9, 2004). "Metadata Creation System for Mobile Images," MobiSys'04 Boiton, Massachusetts, pp. 36-48.

Toyama, K. et al. (Nov. 2-8, 2003). "Geographic Location Tags on Digital Images," MM '03'Berkeley: California. 12 pages.

U.S. Appl. No. 11/593,668, filed Nov. 6, 2006 for Naaman, et al.

U.S. Appl. No. 11/593,869, filed Nov. 6, 2006 for Naaman, et al.

"Gutenkarte" Book Catalog, 2006 MetaCarta, Inc., www.gutenkarte.org 11pgs.

Baron, N.S. et al. (Aug. 30, 2005). "Tethered or Mobile? Use of Away Messages in Instant Messaging by American College Students," Chapter 20.1 in Mobile Communication, Springer: London, England, 31:293-297.

Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/ >, last visited on Feb. 2, 2010, thirteen pages.

Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h >..., last visited on Feb. 2, 2010, ten pages.

Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p...,> last visited on Feb. 2, 2010, seventeen pages.

Wooldridge, M. et al. (2005). "STALK. The Camera-phone Scavenger Hunt!" located at <http://www.stalk.com >, last visited on Dec. 28, 2009, two pages.

www.stalk.com (retrieved on Dec. 29, 2009) pp. 1-2.

Anonymous. (Date Unknown). "CommunityWalk—About," located at <http://www.communitywalk.com/about >, last visited on Mar. 3, 2008, one page.

Anonymous. (Date Unknown). "CommunityWalk Mapping Made Easy," located at <http://www.communitywalk.com/>, last visited on Mar. 3, 2008, one page.

Anonymous. (Date Unknown). "Google Earth User Guide" located at <http://earth.google.com/userguide/v4/>, last visited on Feb. 27, 2008, twelve pages.

Anonymous. (Date Unknown). "Google Earth—Wikipedia, the Free Encyclopedia," located at <http://en.wikipedia.org/wiki/Google_earth >, last visited on Mar. 3, 2008, fourteen pages.

Anonymous. (Date Unknown). "Google Earth User Guide—Using Image Overlays and 3D Models," located at <http://earth.google.com/userguide/v4/ug_imageoverlays.html >, nine pages.

Anonymous. (Date Unknown). "Google Maps," located at <http://en.wikipedia.org/wiki/Google_maps >, last visited on Feb. 27, 2008, eleven pages.

Anonymous. (Date Unknown). "Live Search Maps," located at <http://en.wikipedia.org/wiki/Windows_live_maps >, last visited on Mar. 3, 2008, six pages.

Anonymous. (Date Unknown). "WikiMapia," located at <http://en.wikipedia.org/wiki/WikiMapia >, last visited on Mar. 3, 2008, three pages.

Anonymous. (2007). "Ask.com Maps & Directions," located at <http://maps.ask.com/maps >, last visited on Mar. 3, 2008, one page.

Anonymous. (2007). "Wayfaring Follow You, Follow Me," located at <http://www.wayfaring.com/>, last visited on Mar. 3, 2008, three pages.

Anonymous. (2008). "Platial the People's Atlas," located at <www.platial.com >, last visited on Mar. 3, 2008, one page.

Anonymous. (2008). "Wikimpaia.org ," located at <http://wikimpaia.org/>, last visited on Mar. 3, 2008, one page.

\* cited by examiner

SUMMARIZATION OF MEDIA OBJECT COLLECTIONS

BACKGROUND

Field

The present invention relates generally to systems and methods for the summarization of a collection of media objects, and in one example, to the summarization of a collection of geographically-referenced (or "geo-referenced") media objects such as still or moving images, audio files, and the like.

Related Art

With the popularization of digital photography, people are now capturing and storing far more photographs than ever before leading to the creation of large collections of photographs. These large collections of photographs are generally difficult to navigate, due to their size and the inability of computers to understand the content of the photographs. Yet, viewing and interacting with such collections has a broad social and practical importance. For example, billions of images, many of which are stored and accessible on the Web, constitute a growing record of our culture and shared experiences. However, the prospect and practicality of viewing these photograph collections in a meaningful way has become difficult.

Some attempts have been made to improve viewing and navigating large collections of photographs. For example, implementations of geographical-referencing (or "geo-referencing") of digital photographs, whereby photographs are connected to metadata describing the geographic location in which they were taken (whether by GPS, or other location technologies) may improve viewing and navigating large collections. Mobile phones, and especially camera phones, are probably the most accessible ubiquitous computing platforms. Modern camera phones, outfitted with the appropriate software and/or service plan, can associate geographic data with images and increase the number of geo-referenced photographs available online. Already, an increasing number of photographs on the Web are associated with the GPS coordinates at which they were taken. Such geo-referenced photographs can be categorized geographically or displayed on a map, providing a rich spatial context in which to view a collection of photographs.

As photograph collections grow, however, such systems are typically limited by the computing problem of being able to filter, sort, and summarize the collection of photographs in any useful manner. For example, displaying photographs on a digital map inevitably leads to the viewable space becoming cluttered as the number of photographs increases, leading to overlapping photographs and making viewing and finding specific photographs ever more difficult as the collection grows.

BRIEF SUMMARY

According to one aspect of the present invention a system and method for summarizing a collection of media objects is provided.

In one example, an apparatus is provided for summarizing a collection of geographically referenced media objects (e.g., still or moving images, audio files, and the like), the apparatus including selection logic for selecting a subset of the media objects based on a pattern of the media objects within a spatial region. The pattern may relate, for example, to the density and location of the media objects with a particular spatial region of interest.

The selection logic may further select the media objects based on (or be biased by) various social aspects, temporal aspects, spatial aspects, or combinations thereof. For example, aspects of the user such as the identity of the user, social connections, groups, etc., associated with the user and so on may be used to select the summary or subset of media objects. The selection may be based on temporal or spatial aspects of the media objects, as well as various visual features and signal properties of the media objects. Further, the selection may be based on metadata associated with the media objects (where the metadata may include automatically, semi-automatically, or manually associated metadata with the media objects, e.g., whether data, event information, and the like).

In another example, an apparatus is provided for summarizing a collection of media objects from one or more users. The apparatus generally includes clustering logic for clustering a collection of media objects (e.g., still or moving images, audio files, and the like) in a cluster structure (e.g., a hierarchical structure) having a plurality of subclusters, ranking logic for ranking the media objects of the plurality of subclusters, and selection logic for selecting a subset of the media objects based on the ranking of the media objects.

The subset may represent a summary of the collection of media objects according to the particular clustering logic and ranking logic of the apparatus. Further, inputs to the apparatus may bias the selected subset, e.g., by altering the hierarchical cluster structure and/or ranking of the media objects. In various examples, the subset may be based on spatial patterns of the media objects as well as social, temporal, and textual-topical factors. Accordingly, the summary may be biased by the content of the query, the user making the query, the context in which the query is made, or combinations thereof.

In one example, each of the media objects is geographically referenced (e.g., via GPS coordinates or other location technology), and the apparatus further includes logic for displaying the subset of media objects with or overlaying a map. Further, the apparatus may cluster the media objects based on the geographical locations associated with the media objects. Additionally, the apparatus may further comprise logic for selecting the subset of media objects based on a particular zoom level (e.g., a spatial or temporal region), and select a new subset of media objects in response to changing the zoom level, thereby providing a semantic zoom function for the collection of media objects.

The apparatus may further comprise logic for scoring each subcluster according to at least one metadata attribute of the media objects. For example, the metadata attribute may include, but is not limited to, factors such as bias (or relevance), tag-distinguishability, photographer-distinguishability, density, and the sum of image (and/or audio) qualities of the cluster. The apparatus may further interleave the media objects from the subclusters and prioritize the media objects according to the scoring of each subcluster.

In yet another example, the apparatus may select metadata tags associated with the subset of media objects selected. The tags may be displayed with a map of a particular spatial region to form a "tag map." Additionally, the tags may be displayed in varying sizes and/or colors to indicate aspects of the tags, such as their ranking within the collection, frequency, recency, and so on.

According to another aspect, a method for summarizing a collection of media objects is provided. In one example, a method includes selecting a subset of media objects from a collection of geographically referenced media objects based on a pattern of the media objects within the spatial region.

The pattern may relate, for example, to a density of the media objects within the spatial region, and the selection may further be based on other aspects such as social, spatial, temporal, or combinations thereof.

In another example, a method includes clustering a plurality of media objects according to a hierarchical cluster structure, the hierarchical cluster structure having a plurality of subclusters, ranking the media objects of the plurality of subclusters, and selecting a subset of the media objects based on the ranking of the media objects. The displayed media objects may include a geographical reference associated therewith, the method further including displaying the subset of the media objects with a map according to the geographical references According to another aspect, computer program product including computer-executable program code for summarizing a collection of media objects is provided. In one example, the product comprises program code for selecting a subset of media objects from a collection of geographically referenced media objects based on a pattern of the media objects within the spatial region. The pattern may relate, for example, to a density of the media objects within the spatial region, and the selection may further be based on other aspects such as social, spatial, temporal, or combinations thereof.

In another example, the product comprises program code for clustering a plurality of media objects according to a hierarchical cluster structure, the hierarchical cluster structure having a plurality of subclusters, ranking the media objects of the plurality of subclusters, and selecting a subset of the media objects based on the ranking of the media objects.

The various aspects and examples of the present inventions are better understood upon consideration of the detailed description below in conjunction with the accompanying drawings and claims.

DETAILED DESCRIPTION

The following description is presented to enable a person of ordinary skill in the art to make and use the inventions. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the inventions. Thus, the present inventions are not intended to be limited to the examples described herein and shown, but are to be accorded the scope consistent with the claims.

For the sake of convenience, at times, digital photographs or still images are used and described as examples of media objects manipulated by the exemplary system, but those skilled in the art will recognize that the various examples apply similarly or equally to other media objects, subject to appropriate modifications and use of other functions where appropriate (e.g., viewing a media object may apply to viewing a still or moving image or listening to an audio media object, such as a soundtrack).

Figure 1:
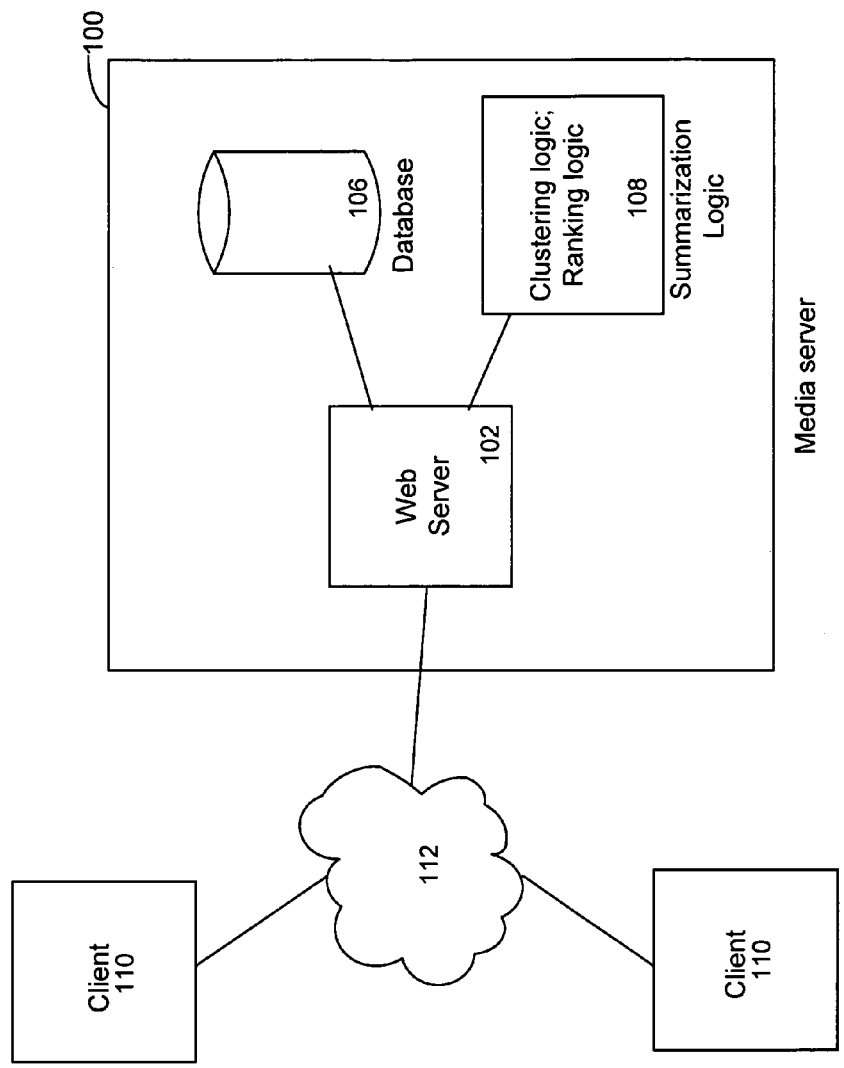
FIG. 1 illustrates an exemplary environment in which some aspects and examples described herein may by used.

FIG. 1 illustrates an exemplary environment in which some examples of summarizing a collection of media objects as described may be used. In particular, FIG. 1 illustrates a client-server system in which one or more clients 110 may communicate with a media server 100 via a network 112. Media server 100 may include a web server 102 interfacing with network 112 and including http web server logic, for example. Further, media server 100 includes a database 106 for storing media objects and summarization logic 108 for processing one or more collections of media objects stored in database 106 (or otherwise associated with media server 100).

Clients 110 and media server 100 may communicate, e.g., via suitable communication interfaces via a network 112, such as the Internet. Clients 110 and media server 100 may communicate, in part or in whole, via wireless or hardwired communications, such as Ethernet, IEEE 802.11b wireless, or the like. Additionally, communication between clients 110 and media server 100 may include various servers such as a photograph/image server, map server, mail server, mobile server, and the like.

Media server 100 includes logic or is programmed to process media objects and format data, accessed from local or remote databases or other sources of data, for presentation to users of clients 110, preferably in the format discussed in the examples herein. To that end, media server 100 may utilize various Web data interface techniques such as Common Gateway Interface (CGI) protocol and associated applications (or "scripts"), Java® "servlets", i.e., Java® applications running on the Web server, or the like to present information and receive input from clients 110. Media server 100, although described herein in the singular, may actually comprise plural computers, devices, backends, and the like, communicating (wired and/or wireless) and cooperating to perform some or all of the functions described herein. An exemplary media server is described in U.S. patent application Ser. No. 11/350,635, entitled "MEDIA OBJECT METADATA ASSOCIATION AND RANKING", and filed Feb. 8, 2006, which is hereby incorporated by reference in its entirety as if fully set forth herein. Of course, media server 100 may be implemented in various fashions and include various hardware, software, or firmware to carry out the examples described herein.

In one example, media server 100 includes various components known in the art, e.g., a scripting engine (such as a PHP scripting engine), an aggregation engine, and the like. A scripting engine may include authentication logic, upload logic, metadata processing logic, and permissions handling logic. The authentication logic authenticates a user signing on to the media server web site. The upload logic may be used to upload from the client to the server data conforming to any media format, e.g., still image (e.g., JPEG, TIFF), video (e.g., MPEG, AVI), or audio (e.g., MP3, OGG). The aggregation engine may include a statistics engine and a search engine. A client for use with the server of the invention may include a typical web browser application.

Metadata processing logic permits a user to enter metadata to describe each image (as used herein, "metadata" may refer to one metadatum or plural metadata). Metadata may take the form ozone or more tags for a media object. Other types of metadata include, e.g., a title, a description of the image, annotations, and comments. Additionally, metadata associated with a device (e.g., device-supplied metadata)

such as metadata from a digital camera that took the picture, including metadata regarding time of capture, aperture, shutter speed, and other settings. Such metadata may be extracted, for example, from the EXIF (Exchangeable Image File) header stored inside the uploaded file by many digital cameras, or the IPTC (International Press Telecommunications Council) header stored inside the uploaded file by many photograph management and organization software packages.

Additionally, metadata may include geographical reference data associated with the media object. For example, the device may generate a geographical location (e.g., from a GPS location device, cell identification, or other location technologies). Additionally or alternatively, a user may enter or edit the geographical location associated with a particular media object (either at the time of capture or later).

One or more clients 110 may transfer media objects and/or related metadata to media server 100 for inclusion within database 106. Further, one or more clients 10 may request summaries of a portion or all of the collection of media objects and/or related metadata included with database 106 or otherwise accessible via media server 100. For example, summarization logic 108 may process a collection of media objects stored locally, remotely, or combinations thereof.

In one example, a system and method are described for selecting and displaying a subset (or summary) of a collection of media objects. In one example, media objects of a collection are geographically referenced and pertain generally to a particular spatial region (e.g., a map or categorization of a specified spatial region). An exemplary method and system select a subset of the collection based on a pattern of the media objects within the spatial region. The pattern may be based on spatial aspects, temporal aspects, social aspects (e.g., groups, contacts, connections and the like associated with a particular user or users), or combinations thereof associated with the media objects and/or user. For example, the summary may be based on a pattern of the media objects, e.g., relating to a density of the media objects within a spatial region at particular locations, and also based on one or more characteristics of a user requesting the summary.

Figure 2B:
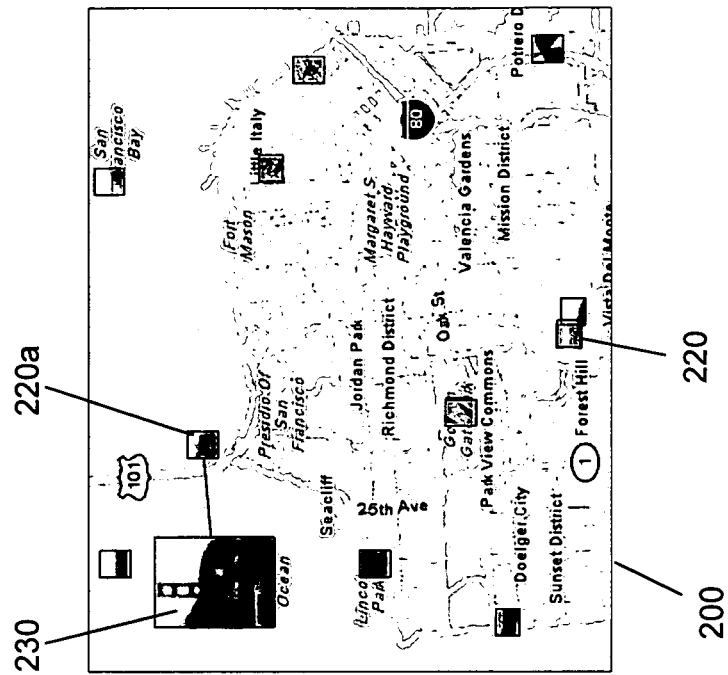
FIGS. 2A and 2B illustrate a display of a collection of media objects and a subset or summary of the media objects, respectively, according to one example.
Figure 2A:
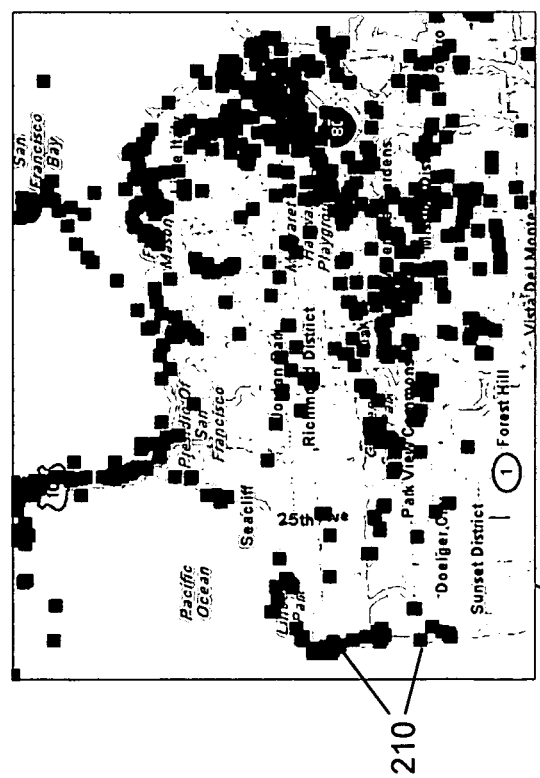

FIG. 2A illustrates a display of a collection of geo-referenced media objects 210 pertaining generally to a particular spatial region. In this example, the spatial region is associated with San Francisco, Calif., and accordingly, the display includes a map 200 of San Francisco, Calif., and media objects 210 displayed overlying map 200 according to their associated geo-references. In this example, each media object is represented by a square (or other indicia on the map), which may be selected by a user to access content of the media object. As the number of media objects 210 in the collection grows, the display may become cluttered and crowded, making viewing the collection of media objects difficult.

Exemplary summarization logic (included with media server 100, for example) as described in greater detail below, may produce a summary of the media objects as shown in FIG. 2B based on one or more patterns of the media objects as well as various other social, temporal, and/or spatial aspects of the media objects and/or a user requesting the summary. For example, the system and method may select a subset of media objects 220 for display with the particular spatial region of interest. Such a subset of the media objects 220, referred to herein as a summary of the collection, may enable users to find items more easily and browse more efficiently through large scale geo-referenced photograph collections in a manner that improves rather than degrades with the addition of more photographs. It is noted that map 200 may be generated or stored locally with media server 100, or alternatively generated or stored remotely to media server 100.

Additionally, display logic may present or display the media objects as thumbnail images over map 200, and which may be expanded in response to user input (e.g., scrolling over media object 220a generates the display of a larger image 230). It will be recognized that in some example a client may further expand image 230, download image 230 to a user device, transfer (e.g., via email) image 230 to other clients, and the like.

In other examples, the system could summarize a collection of media objects according to a spatial region without displaying a map. For example, a summary of the collection could be categorized within the database or presented under headings according to the summarization processing and spatial region of interest. In yet other examples, the summary of media objects (or at least data associated therewith) may be supplied to a third party, which may present the summary with a map, advertisements, and the like, for example.

An exemplary system and method having summarization logic may be used in a number of applications. For example, such an algorithm may be used for geographic image search, returning a summary of photographs from a region in response to a search query (that can be specified as a text term or a map region), and the like. The algorithm can be used to assist in map-based browsing of images, for example, by enabling a "semantic zoom," wherein as a user changes zoom levels, panned to any region, the system displays a subset of images that represent that region. For example, FIG. 2B shows a map of San Francisco in which a limited set of eleven images that were selected by an exemplary system are marked on the map. When the user zooms in, the system logic may operate to generate a new subset or summary of images to display to the user at the new zoom level. Additionally, a user may use the exemplary system and method to browse one's own image collection or a group of other user image collections to get an overview of a location.

Selecting representative media objects from a collection of media objects and for a given spatial region posses several difficulties. For instance, image analysis alone is generally poor at understanding the semantic content of an image, for example, making purely visual relevance insufficient for summarizing a collection of media objects. In collection from multiple users, the biases of one user's data may also bias the selection towards generally insignificant subjects. The notion of relevance is not well defined, and often subjective; it is therefore difficult for an automated system to learn and assess the relevance of photographs without appropriate models of human interest.

In one example, the summarization logic 108 of media server 100 includes metadata-based heuristics associated with patterns in the photographs and users' photographic behavior. An exemplary heuristic includes the premise that photographs taken at a particular geographical location typically imply the presence of something interesting at the particular geographical location; for example, the attention paid to an object is generally an indicator of its importance. Thus, in one example, the summarization logic includes an algorithm operable to input one or more of a multitude of spatial, social, and temporal metadata, such as where the photograph was taken, by whom, at what time, etc., as well as textual-topical patterns in the data, such as textual tags associated with the photograph (e.g., user inputted tags). Furthermore, the algorithm may be adjusted to bias the set of results using various factors such as the social network distance of the photographers to the user making the query.

It is noted that the specific example and algorithms described are illustrative of a specific implementation of selecting a summary of media objects from a collection of media objects. Those of ordinary skill in the art will recognize that other systems and methods, utilizing various algorithms and inputs related to the media objects or the user, may be used to select summaries based on patterns within the collection of media objects. Accordingly, the following example is not intended to be limiting.

In this example, summarization logic 108 operates on a collection of media objects to produce a subset or summary of the collection of media objects. For instance, given a collection of n photographs, $A=\{P_1, \ldots, P_N\}$, the exemplary method and system determines a permutation $\pi$ of A such that any k-length prefix of $\pi(A)$ is a k-element summary of A. It is desired that a summary, generally referring to a subset of the media collection, capture representativeness, relevance, and breadth in the original collection, for example. In one example, a summary is captured through a subset of one or more metadata attributes that are associated with the photographs. Exemplary metadata attributes may include, but are not limited to, any combination of location (e.g., photograph $P_i$ was taken at location $(x_i, y_i)$), time (e.g., photograph $P_i$ was taken at time $t_i$), photographer (e.g., photograph $P_i$ was taken by user $u_i$), tags (e.g., photograph $P_i$ was manually assigned the list of textual tags $w_i$), quality (photograph $P_i$ is associated with an externally derived parameter $q_i$ that represents its image quality), bias (also referred to herein as "relevance," e.g., photograph $P_i$ is associated with a relevance factor $r_i$; relevance may include arbitrary biases (or preferences) based on parameters such as recency, time of day, day of the week, social aspects such as a social network of the user, textual tags associated with that photo, etc.), user profiles, and the like.

The system includes logic for selecting a subset of the collection of photographs following a few heuristics, which may be adjusted by a user or the media server. Exemplary heuristics include, for example, that photographs are taken at locations that provide views of some interesting object or landmark, a location is more relevant if photographs were taken at the location by a large number of distinct photographers, and if available, location-specific patterns of textual tags can reflect the presence of interesting landmarks in a location.

It is noted that a distinction is made herein between the location of the camera (or other device used to capture the media object) and the location of the photographed object. For example, most geographic data associated with photographs pertains to the camera location. In some instances the two locations are near each other (for example, when the photograph is of a house or, say, a fountain), while in other cases (a photograph of, say, the Golden Gate Bridge) the camera may be a considerable distance from the object (e.g., miles away). In one example, the system receives as input the location of the camera, and associates the tags with that location even if the photographed object is remote.

In addition to heuristics listed above, an exemplary system may also operate to represent a broad range of subjects, instead of thoroughly display a few, and allow personal or query bias to modify the system's results. For example, an exemplary system may include the flexibility to allow a user to specify a personal bias, or preference, toward any of the available features of the system and/or to utilize implicit bias in the query context and history. For example, a user may bias by any quantifiable feature of the photographs, such as the social distance of the photographer to the user, preference for weekend photographs, the externally determined quality of the image, and the like.

In one example, the system includes logic for producing an ordering of photographs in the collection. Generally, producing the ordering of photographs comprises two broad processes: clustering the photographs of the collection, and ranking the photographs. These processes may be carried out by clustering logic and ranking logic included with summarization logic 108 (see, e.g., FIG. 1).

In one example, the clustering logic may cluster photographs of a media collection based on their respective geographic locations. This may be accomplished by various known clustering methods. In one example, the clustering logic is operable for clustering the photographs based on their geographical locations into a hierarchical clustered structure (for example, having a series of subclusters). The exemplary system further includes ranking logic for ordering the photographs within the cluster generated by the clustering logic. An ordering of the photographs may be generated, for example, by interleaving photographs from the collection subclusters, prioritized according to a calculated score. The ranking logic may then recursively rank the photographs for each of the subclusters, starting from the leaf clusters. A summarization of the photographs, e.g., via a display of the photographs, for a specified spatial region may then be generated based on the ranking of photographs within the collection subclusters.

Figure 3:
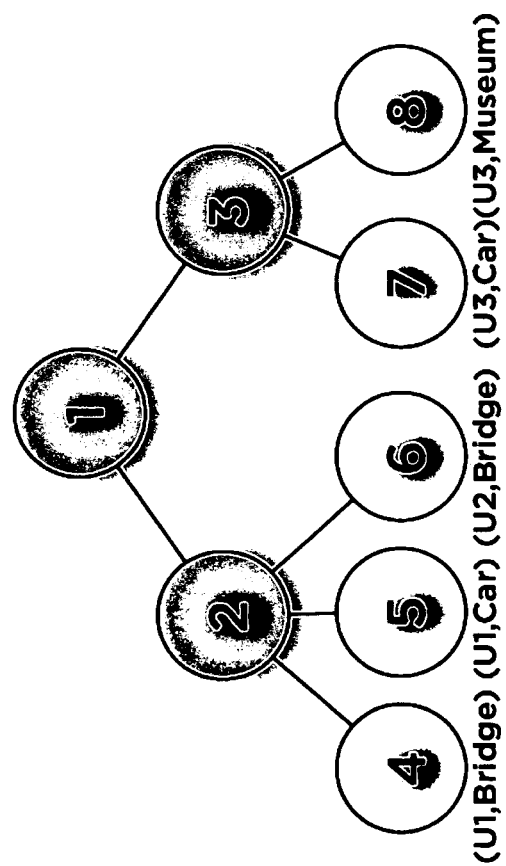
FIG. 3 illustrates conceptually an exemplary hierarchical clustering according to one example.

To illustrate the summarization process and scoring mechanism, an exemplary hierarchical cluster structure is illustrated in FIG. 3. In particular, the leaf nodes represent photographs, each annotated with the identity of the photographer and a single textual tag (in practice, of course, different and additional tags may be used). The tree represents the hierarchy created by the clustering logic of the apparatus or system.

In one example, the clustering logic and particular clustering algorithm may include a Hungarian method, which is known in the art, or a modification thereof. One particular modification to the Hungarian method includes the method described in "The Hungarian Clustering Method," by Jacob Goldberger and Tamir Tassa, the content of which is published at, http://www.openu.ac.il/Personal_sites/tamirtassa/Publications/hcm.pdf, and which is incorporated herein by reference. Other exemplary clustering methods may include conglomerative clustering, partitional clustering, hierarchical agglomerative, divisive clustering, or the like.

In this example, the clustering logic is generally operable to identify a hierarchy of clusters within a given dataset (e.g., generated from the collection of media objects) of points in n dimensions, based only on the distances between those points. The input to that algorithm is a set of points in the plane $$A=\{(x_i,y_i)\in \mathbb{R}^2, 1\le i\le n\}, \qquad (1)$$

and the output is a clustering of those points C(A), where C(A) is a tree; each node in the tree represents a subset of A; and the children of each node are a partition (or clustering) of the subset that is associated with that node.

Given a hierarchical clustering based on the locations of the photographs, for example, the ranking logic is operable to produce a ranking of each object or item in the collection. In one example, the ranking logic first assigns a score to each cluster, and performs a recursive interleaving algorithm that uses the clustered structure and the corresponding scores in order to produce a natural flat ordering. For example, given a hierarchical clustering C(A) of A, where A is possibly itself a subcluster in a larger hierarchy, the algorithm outputs a permutation π on A that represents ranking on A. That ordered sequence is denoted henceforth by S=π(A).

Assume that m subclusters are identified in A, $A=U_{i=1}^{m}=A_i$, and that $$f(A_1) \geq f(A_2) \geq \ldots f(A_m)$$

where f represents a black box determining the cluster score. In one example, each cluster represents a different site or focal point in the area where the photographs were taken. Moreover, the subclusters of each of the clusters may represent different locations within the corresponding site.

In one example, it is desired that the ranking logic produce a ranking that would balance the contradicting properties of depth and breadth of coverage. For example, consider the second level of the exemplary hierarchy shown in FIG. 3, which includes two clusters $C_2$ and $C_3$, and assume $f(C_2):f(C_3)=5:3$. In one example, the system interleaves the photographs from the two clusters so that in any section of the sequence S, the frequencies of photographs from the clusters relate to each other as closely as possible to their score ratio in the whole dataset, i.e., 5:3. On the other hand, for purposes of breadth, it is desired that each reasonably good subcluster should be at least somewhat represented early in the ranking of its parent.

Accordingly, in an attempt to balance some amount of depth, breadth, and consistency according to one example, the summarization logic and algorithm assumes that the photographs in each subcluster of a current A have been ranked recursively according to the algorithm. The ordered sequence of photographs for A will then have two parts: a short header H followed by a trailer T, where S(A)=H∥T.

The header H will include a photograph from all prominent clusters. To that end, a threshold 0<w<1 is defined and a cluster $A_i$ is deemed prominent if $$\frac{f(A_i)}{\sum_{j=1}^{m} f(A_j)} \geq w.$$

Assume that there are m' prominent clusters among the m clusters, with 0≤m'≤m. Then the header is $$H=(A_{1,1}, A_{2,1} \ldots A_{m',1}),$$

where $A_{i,j}$ means the jth most relevant photograph from cluster $A_i$.

Next, a trailer is generated. In one example, each cluster is assigned a probability that equals its score divided by the sum of scores of all clusters. These probabilities are then used to randomly select a cluster. If cluster $A_i$ was selected, its top-ranked remaining photograph is removed and appended to T and the score and probability of that cluster is recalculated to reflect the removal of its top photo. The process of selecting photographs and appending them to the trailer is repeated until all photographs have been selected.

The score of a cluster $A_i$ may depend on several factors or attributes of the clusters, including, for example, the following (which will be described in greater detail below):

The sum of bias factors (e.g., relevance) of all photographs in the cluster, $$\rho_i = \sum_{P_j \in A_i} r_j.$$

The tag-distinguishability of the cluster, $\tau_i$.
The photographer-distinguishability of the cluster, $\emptyset_i$.
The density of the cluster. More specifically, let $\sigma_{x,i}$ and $\sigma_{y,i}$ denote the standard deviation of the x and y coordinates, respectively, of all points in $A_i$, and let $$\sigma_i = ((\sigma_{x,i})^2 + (\sigma_{y,i})^2)^{1/2}.$$

The cluster density may be defined as $$\delta_i = 1/(1+\sigma_i). \qquad (2)$$

The sum of image qualities of all photographs in the cluster, $$\kappa_i = \sum_{P_j \in A_i} q_j.$$

It is noted that while most of the above factors may be derived from data that is contained in the collection of media objects (e.g., included with the metadata), the bias factor depends on subjective requirements that are introduced through the query to the photograph collection (e.g., set by the system for a particular application or by a user via their particular request).

Bias (relevance) Factors: In one example, the bias factor $r_i$ of a photograph $P_i$ may depend on one or more parameters such as recency, the time of day, the time of the week, the photographer, textual tags associated with that photo, and the like. Each photograph may be assigned a score $\theta(P_i)$ in the range [0,1] for each such parameter. The final bias score can be a weighted average of all these scores, which is the bias score $r_i$ of photograph $P_i$. The amount to which each feature contributes to the overall bias calculation can be specified by a user, or set by the system according to the application.

For example, a user may request photographs taken during the day, or by a set of one or more photographers (e.g., their contacts, friends, family, etc.). These inputs will weight the bias factors accordingly, thereby biasing the results per the user query.

Tag distinguishability of the cluster: In one example, tag distinguishability aims to detect distinct or unique concepts that are represented by a given cluster by examination of the tags. The assumption is that the more unique concepts a cluster represents, the more semantically meaningful a cluster tends to be. For example, in FIG. 2, the tag "bridge" appears in two photographs from Cluster 2, and does not appear elsewhere. As a consequence, the score of Cluster 2 improves. On the other hand, the tag "car" appears in photographs from both Cluster 2 and Cluster 3 and therefore does not help to distinguish either cluster over the other.

Formally, each photography $P_j$, 1≤j≤n, is tagged with tags that are drawn from a finite dictionary. Let $F_{t,i}$ denote the frequency (count) of t in $A_i$ (the usual term frequency of the tag/term t in the cluster/document $A_i$, as often used in information retrieval). There are several ways to measure how the term t distinguishes the cluster $A_i$ from other clusters. Denoting such measures by $T_{t,i}$, the usual measure in information retrieval is the tf-idf weight (where term frequency—inverse document frequency is also familiar and well known in the art of information retrieval). The measure is defined as $$T_{t,i} = tfidf_{t,i} = tf_{t,i} \cdot idf_t, \quad (3)$$

where, $tf_{t,i} = F_{t,i}$, while $$idf_t = \frac{n}{|\{P_j \in A : t \in T(P_j)\}|} \quad (4)$$

is a measure of the overall frequency of the tag t in the entire photograph collection. Another alternative to (3) which is used in information retrieval is $$T_{t,i} = tfidf_{t,i} = tf_{t,i} \cdot \log(idf_t). \quad (5)$$

Large values of both weights indicate that the number of occurrences of t in $A_i$ is large with respect to its number of occurrences elsewhere.

It is noted that in the usual tf-idf weight, the document-frequency is defined as the frequency of clusters in which the tag appears, as opposed to the frequency of actual tag occurrences. However, the usual definition is generally not suitable for cases where the number of clusters (documents) is small. In such cases, a single random occurrence of a tag in a cluster may have a significant effect on the usual measure, while in this instance it would be hardly noticeable.

Next, an overall tag-distinguishability measure for $A_i$, $T_i$, is defined based on the tag-distinguishability measures of all tags in the cluster, $\{T_{t,i} : t \in T\}$. The overall score may be computed by using the Euclidean measure based on the $l_2$-norm, $$\tau_i = \left(\sum_{t \in T} \tau_{t,i}^2\right)^{1/2}. \quad (6)$$

Photographer distinguishability of clusters: In one example, a measure of photographer distinguishability (or user distinguishability) is determined, which may indicate how much a given cluster is associated with a small number of photographers, making the cluster less likely to be semantically meaningful. For example, in FIG. 3, all photographs in Cluster 3 were taken by the same user (U3), and that that user did not take any photographs at other locations. This may suggest that Cluster 3 may have less general appeal than, for example, Cluster 2 in FIG. 3, which includes photographs from two users (U1 and U2).

Hence, much like for tags, a tf-idf-like score for the correlation between a cluster $A_i$ and a photographer u may be used. For example, let $B_u$ denote the set of locations of photographs that were taken by the photographer u (as with the set A, (1), of all photograph locations, $B_u$ is a multiset, in the sense that it may include repeated values). The score may then be given by $$\phi_{u,i} = tf_{u,i} \cdot idf_u \quad (7)$$

where $$tf_{u,i} = \frac{|A_i \cap B_u|}{|A_i|} \quad (8)$$

$$idf_u = \frac{n}{|B_u|}. \quad (9)$$

and

Note that (7) and (9) are equivalent to (3) and (4), respectively. As previously, compare (5) with (3), and (7) may be replaced with $$\phi_{u,i} = tf_{u,i} \cdot \log(idf_u). \quad (10)$$

Finally, the overall photographer-distinguishability may then be defined, in this example, as:

$$\phi_i = \left(\sum_u \phi_{u,i}^2\right)^{1/2}. \quad (11)$$

When dealing with tag-distinguishability, the more a given cluster is associated with some tags, the more it is conceived as a 'well-defined' cluster that has prominent distinguishability from other clusters. Photographer-distinguishability, on the other hand, has an opposite effect. The more a given cluster is associated with a single photographer (or few photographers), the less interesting that cluster becomes.

Overall Cluster Score: The score $s(A_i)$ of the cluster $A_i$ depends, in one example, in a monotonically increasing manner on the bias factor, $\rho_i$, and the image quality factor, $\kappa_i$. It also depends in a monotonically increasing manner on the density measure of the cluster, $\delta_i$, (2). The score $s(A_i)$ may also depend in a monotonically increasing manner on $T_i$, the tag-distinguishability measure of the cluster. Finally, the score may depend in a monotonically increasingly manner on $\phi_i^{-1}$, the inverse photographer-distinguishability measure of the cluster, as discussed above. Therefore, the overall score may be represented as $$h(\kappa_i, \delta_i, T_i, \phi_i^{-1}) \cdot \rho_i \quad (12)$$

where h is, for example, a weighted average of its variables, and the weights may be chosen and fine-tuned by experimentation.

It will be understood that the above scoring methods are illustrative of some exemplary methods in which a system may score clusters, and is not intended to be exhaustive or limiting. In other examples, additional or different factors may be used. Additionally, similar factors as described herein, such as bias factors, tag-distinguishability of clusters, etc., may be determined in alternative manners.

A media server including summarization logic as described herein has a number of possible applications and uses. In one example, the media server and summarization logic may be used to as part of or to support a "semantic zoom" application using a large collections of digital images (or other media objects), or assist in browsing/searching a large collection of media objects by initially showing summarized results.

Semantic zoom generally refers to changing the space of interest in which the media objects are related, such as a map, timeline, or combination thereof, where the zoom or change in space is accompanied by a corresponding shift in the level of content represented on the map or timeline. In the example of a spatial map, this may include presenting to a user a number of photographs appropriate to an initial or current zoom level for a given spatial map. The system selects images for display according to the summarization logic (e.g., based on a determined pattern, the particular ranking, etc.). As the user zooms in, more photographs (e.g., that were ranked lower) are revealed, thus bringing the content into more detail. At any zoom level, panned to any region, the system and associated logic automatically displays a summary of photographs that represent that region per the particular summarization logic inputs. Given an ordering on a collection of photographs, a system may quickly display a summary of photographs for varying levels in response to user input. When viewing any region, the system may display the k best photographs that were taken within that region. Alternatively, the system may display a fixed number of photographs for any zoom level, letting the number of photographs that appear in a particular region at that level implicitly correspond to the relevance of that particular region.

Figure 4:
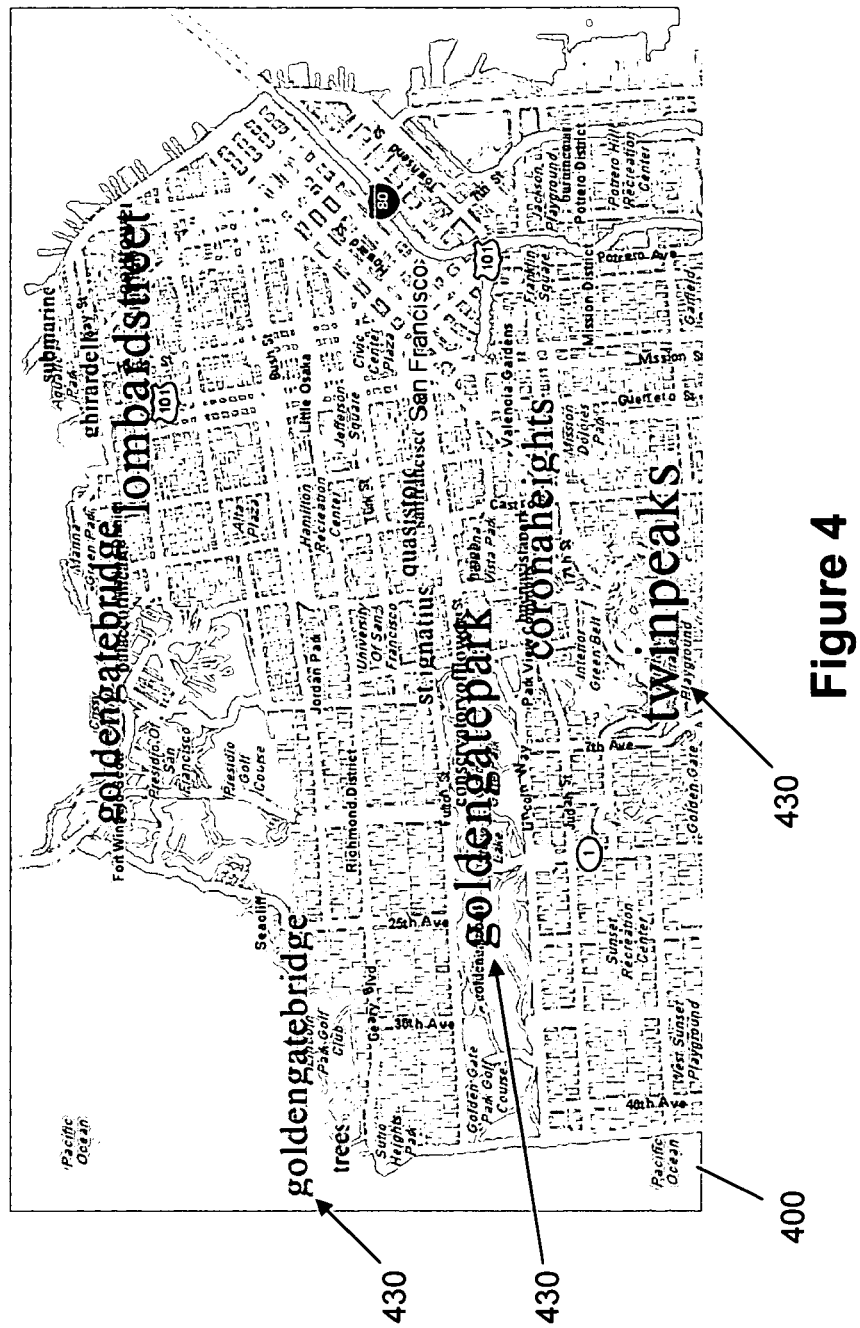
FIG. 4 illustrates an exemplary display of a map having geographically referenced tags according to one example.

In addition, the exemplary summarization logic and algorithm described may be used to generate or seed "tag maps," e.g., a visualization for geo-referenced collections based on textual tags that are associated with the data. FIG. 4 illustrates an exemplary tag map 400 based on a manipulation by a summarization logic as described herein. Tag map 400 displays tags 430, e.g., textual topics, that are associated with specific locations on a map. Tags that are deemed relevant (e.g., according to summarization logic or methods described) may be shown at the location where they "occur" (e.g., based on their geo-locations or user supplied metadata), and in one example may be displayed in a size that corresponds to the tag's importance (which may be based on various attributes of the collection, system, or user), as shown in FIG. 4.

In this example, exemplary summarization logic and methods as described herein generated tag map 400, which represents photo-taking in San Francisco, Calif. Rather than display representative photographs at their respective locations (e.g., as shown in FIG. 2B), this example conveys concepts represented in the dataset through the metadata tags themselves. Further, note that in this example, tags 430 displayed with tag map 400 represent "photograph spots" and not necessarily the locations of the object themselves. For example, the "Golden Gate Bridge" tags, which are shown in multiple locations, are in locations other than the physical location of the Golden Gate Bridge.

In one example, in the tag-distinguishability process described previously, a tag-distinguishability score $\tau_i$ is calculated for each cluster $A_i$ at each level of the hierarchy. In the process, an individual score $\tau_{t,i}$ is calculated for each tag t. This tag score, as a variant of tf-idf, can be thought of as a measure for how well and how uniquely t represents $A_i$. Thus, consider the following mapping: for some 'natural' level of the hierarchy, (to be determined later) let $q_i$ be the tag t ∈ T that maximizes $\tau_{t,i}$. The displayed size of the tag corresponds to its score. In this example, the tags are displayed above the centroids of their given cluster on the map. Additionally, in other examples, other types of information can be encoded in the tag map; for example, recency can be represented via the color of the tag text.

Various aspects described may also be combined in various manners. For example, a tag map can be displayed or selected at different zoom levels via process and methods describe with respect to the zoom aspects. Moreover, tag maps may be used for collections other than geo-referenced photographs: e.g. for visualizing popular search keywords from different areas on the map.

Additionally, the various aspects and examples may be combined or used with other known methods and system. In one example, the exemplary system may operate to select a subset of a collection of media objects (stored remotely or locally) as described herein in response to a search request or function. For example, a subset may be returned or included with search results when a text, image, or other search is performed on an object that is recognized by the system as a spatial object (e.g., Germany, San Francisco, Central Park, or the like).

The various aspects and examples of the inventions can be implemented in any suitable form including hardware, software, firmware or any combination of these. Different aspects of the invention may be implemented at least partly as computer software or firmware running on one or more data processors and/or digital signal processors. The elements and components of an embodiment of the invention may be physically, functionally, and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the claims. Additionally, although a feature may appear to be described in connection with a particular embodiment, one skilled in the art would recognize that various features of the described embodiments may be combined in accordance with the invention. Moreover, aspects of the invention describe in connection with an embodiment may stand alone as an invention.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. An apparatus comprising:
   a processor; and
   a storage medium for tangibly storing thereon program logic for execution by the processor, the program logic comprising:
   receiving logic executed by the processor for receiving, from a client device operated by a user, a query for a summary of media objects;
   determining logic, executed by the processor, for determining metadata associated with each of the media objects;
   summarization logic executed by the processor for summarizing a subset of the media objects into a collection based on both a pattern of the media objects within a spatial region and based on a social network of the user, the summarizing logic comprising heuristics associated with the patterns and the metadata for use with the summarizing, the summarization logic further comprising selection logic for selecting the subset based upon an identity of the user and a characteristic associated with the user; and
   generating logic executed by the processor for generating a visualization for the collection based on textual tags that are associated with the metadata, where a textual tag deemed relevant is displayed in the visualization in a size that corresponds to an importance of the relevant textual tag, the importance of the relevant textual tag based on attributes of the collection.

2. The apparatus of claim 1, wherein the pattern relates to a density of the media objects within the spatial region.

3. The apparatus of claim 1, further comprising selection logic for selecting the subset based upon a temporal aspect of the media objects.

4. The apparatus of claim 3, wherein the temporal aspect relates to recency of the media objects.

5. The apparatus of claim 1, further comprising selection logic for selecting the subset based on a visual feature of the media objects.

6. The apparatus of claim 1, further comprising selection logic for selecting the subset based on text associated with the media objects.

7. The apparatus of claim 1, further comprising selection logic for selecting the subset based on data associated with the media objects.

8. The apparatus of claim 7, wherein the data comprises a user generated tag.

9. The apparatus of claim 1, wherein the query comprises a search query, the search query on an object having a spatial aspect.

10. A method comprising:
receiving, by a computing device from a client device operated by a user, a query for a summary of media objects;
determining, by the computing device, metadata associated with each of the media objects;
summarizing, by the computing device, a subset of the media objects into a collection based on both a pattern of the media objects within a spatial region and based on a social network of the user, the summarizing logic comprising heuristics associated with the patterns and the metadata for use with the summarizing, the summarization logic further comprising selection logic for selecting the subset based upon an identity of the user and a characteristic associated with the user; and
generating, by the computing device, a visualization for the collection based on textual tags that are associated with the metadata, where a textual tag deemed relevant is displayed in the visualization in a size that corresponds to an importance of the relevant textual tag, the importance of the relevant textual tag based on attributes of the collection.

11. The method of claim 10, wherein the pattern relates to a density of the media objects within the spatial region.

12. The method of claim 10, wherein the summarizing further comprises selecting the subset based upon a temporal aspect of the media objects.

13. The method of claim 10, wherein the summarizing further comprises selecting the subset based on a visual feature of the media objects.

14. The method of claim 10, wherein the summarizing further comprises selecting the subset based on text associated with the media objects.

15. The method of claim 10, wherein the summarizing further comprises selecting the subset based on data associated with the media objects.

16. The method of claim 15, wherein the data comprises a user generated tag.

17. The method of claim 10, wherein the query comprises a search query, the search query on an object having a spatial aspect.

18. A non-transitory computer readable storage medium comprising computer-executable instructions executed by a processor for summarizing a collection of media objects, the instructions for:
receiving, by the processor from a client device operated by a user, a query for a summary of media objects;
determining, by the processor, metadata associated with each of the media objects;
summarizing, by the processor, a subset of the media objects into a collection based on both a pattern of the media objects within a spatial region and based on a social network of the user, the summarizing logic comprising heuristics associated with the patterns and the metadata for use with the summarizing, the summarizing further comprising selecting, by the processor, the subset based upon an identity of the user and a characteristic associated with the user; and
generating, by the processor, a visualization for the collection based on textual tags that are associated with the metadata, where a textual tag deemed relevant is displayed in the visualization in a size that corresponds to an importance of the relevant textual tag, the importance of the relevant textual tag based on attributes of the collection.

19. The non-transitory computer readable storage medium of claim 18, wherein the pattern relates to a density of the media objects within the spatial region.

20. The non-transitory computer readable storage medium of claim 18, wherein the summarizing further comprises selecting the subset based upon a temporal aspect of the media objects.

21. The non-transitory computer readable storage medium of claim 18, wherein the summarizing further comprises selecting the subset based on a visual feature of the media objects.

22. The non-transitory computer readable storage medium of claim 18, wherein the summarizing further comprises selecting the subset based on data associated with the media objects.

23. The non-transitory computer readable storage medium of claim 22, wherein the data comprises a user generated tag.

24. The non-transitory computer readable storage medium of claim 18, wherein the query comprises a search query, the search query on an object having a spatial aspect.

* * * * *